(12) United States Patent
Thornhil et al.

(10) Patent No.: US 11,494,718 B2
(45) Date of Patent: Nov. 8, 2022

(54) RUNBOOK DEPLOYMENT BASED ON CONFIDENCE EVALUATION

(71) Applicant: International Business Machines Corporation, Armonk, NY (US)

(72) Inventors: Matthew Richard James Thornhil, London (GB); David Jon Griffin, Reigate (GB); Luke Taher, Heswall (GB)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 17/008,769

(22) Filed: Sep. 1, 2020

(65) Prior Publication Data

US 2022/0067620 A1 Mar. 3, 2022

(51) Int. Cl.
*G06Q 10/06* (2012.01)
*G06Q 10/10* (2012.01)

(52) U.S. Cl.
CPC ..... *G06Q 10/06316* (2013.01); *G06Q 10/067* (2013.01); *G06Q 10/0633* (2013.01); *G06Q 10/063114* (2013.01); *G06Q 10/103* (2013.01)

(58) Field of Classification Search
CPC ...................................................... G06Q 10/06
See application file for complete search history.

(56) References Cited

U.S. PATENT DOCUMENTS

| | | | |
|---|---|---|---|
| 6,507,821 B1 | 1/2003 | Stephanou | |
| 8,533,608 B1 | 9/2013 | Tantiprasut | |
| 8,713,436 B2 | 4/2014 | Cheng | |
| 9,104,753 B2 | 8/2015 | Stuempfle | |
| 9,779,386 B2 | 10/2017 | Swierz, III | |
| 9,785,988 B2 | 10/2017 | Petri | |
| 10,238,948 B2 | 3/2019 | Morton | |
| 2002/0029167 A1 | 3/2002 | Müller | |
| 2009/0012833 A1 | 1/2009 | Kuhlke | |
| 2010/0274814 A1* | 10/2010 | Grace | G09B 7/02 707/E17.108 |
| 2015/0012635 A1 | 1/2015 | Ennis | |
| 2015/0142825 A1 | 5/2015 | Deshmukh | |
| 2017/0249283 A1 | 8/2017 | Gupta | |
| 2019/0087781 A1* | 3/2019 | Mercury | G06Q 10/067 |
| 2020/0004618 A1 | 1/2020 | Thornhill | |
| 2020/0293946 A1* | 9/2020 | Sachan | G06N 20/00 |

OTHER PUBLICATIONS

"Assigning Operators to Incidents", U.S. Appl. No. 16/794,586, filed Feb. 19, 2020, 60 pages.
Mell et al., "The NIST Definition of Cloud Computing", NIST National Institute of Standards and Technology U.S. Department of Commerce, Special Publication 800-145, Sep. 2011, 7 pages.

* cited by examiner

*Primary Examiner* — Kurtis Gills
(74) *Attorney, Agent, or Firm* — Stephen R. Yoder

(57) ABSTRACT

Runbook deployment based on confidence evaluation. Obtaining a runbook based on commands, where the commands relate to resolving an incident and determining an aggregated skill level of operators for the runbook based on historical resolutions of incidents by the operators. A confidence measure of the runbook is determined according to the aggregated skill level for the runbook. Deployment of the runbook is performed in accordance with the confidence measure.

19 Claims, 8 Drawing Sheets

RUNBOOK DEPLOYMENT BASED ON CONFIDENCE EVALUATION

BACKGROUND

The present invention relates to runbook deployment for problem incidents, and more specifically, to runbook execution based on confidence evaluation according to operator skill levels. When a failure occurs in an information technology system, the teams supporting the system need to know that an issue has occurred and need to diagnose and fix the issue.

The monitoring and repair of information technology services in a client data center, cloud or hybrid environment can be difficult across the many layers (for example, code, data, runtime, middleware, operating system, virtualization, servers, storage and networking). Across all the many layers it is key that all required components are operating correctly and that no parts of the system have failed. When a failure does occur, the teams supporting the services need to know that an issue has occurred and need some way of finding out how to diagnose and fix the issue.

Information Technology Service Management software provides a means for support teams to track and assign these issues. Issues are assigned to a member of the support team, known as an operator, who is then responsible for resolving the issue, usually by issuing a sequence of computer commands on the affected systems. A common mechanism for fixing the issues is to provide a set of instructions to first responders called a runbook.

Failures are presented in the form of events, which describe the failure state, where the failure occurred as well as extra metadata around the failure state. If the failure is of a common type, an enterprise will have typically written a list of instructions for the operator describing how to fix the issue in the form of a runbook. If, however, there are no existing instructions, the operator will have to fix the issue manually, often involving interacting with affected remote systems through a command line interface using commands which relate in some way to the events generated as a result of the failure.

Once a new issue has been fixed, a new runbook may be automatically generated so that in future operators will have a list of instructions available to fix similar issues.

SUMMARY

According to an aspect of the present invention there is provided a computer-implemented method for runbook deployment based on confidence evaluation, comprising: obtaining a generated runbook based on commands entered by one or more operators, wherein the commands relate to resolving an incident; determining an aggregated skill level of the one or more operators for the generated runbook based on historical resolutions of incidents by the one or more operators; determining a confidence measure of the generated runbook based on the aggregated skill level for the generated runbook; and instructing deployment of the generated runbook in accordance with the confidence measure.

According to an aspect of the present invention there is provided a system for runbook deployment based on confidence evaluation, comprising: a processor and a memory configured to provide computer program instructions to the processor to execute the function of the components: a runbook obtaining component for obtaining a generated runbook based on commands entered by one or more operators, wherein the commands relate to resolving an incident; an aggregated skill level component for determining an aggregated skill level of the one or more operators for the generated runbook based on historical resolutions of incidents by the one or more operators; a confidence measure component for determining a confidence measure of the generated runbook based on the aggregated skill level for the generated runbook; and a deployment instructing component for instructing deployment of the generated runbook in accordance with the confidence measure.

According to an aspect of the present invention there is provided a computer program product for runbook deployment based on confidence evaluation, the computer program product comprising a computer readable storage medium having program instructions embodied therewith, the program instructions executable by a processor to cause the processor to: obtain a generated runbook based on commands entered by one or more operators, wherein the commands relate to resolving an incident; determine an aggregated skill level of the one or more operators for the generated runbook based on historical resolutions of incidents by the one or more operators; determine a confidence measure of the generated runbook based on the aggregated skill level for the generated runbook; and instruct automatic deployment of the generated runbook in accordance with the confidence measure.

The computer readable storage medium may be a non-transitory computer readable storage medium and the computer readable program code may be executable by a processing circuit.

BRIEF DESCRIPTION OF THE DRAWINGS

Runbook deployment based on confidence evaluation. Obtaining a runbook based on commands, where the commands relate to resolving an incident and determining an aggregated skill level of operators for the runbook based on historical resolutions of incidents by the operators. A confidence measure of the runbook is determined according to the aggregated skill level for the runbook. Deployment of the runbook is performed in accordance with the confidence measure.

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Figure 1:
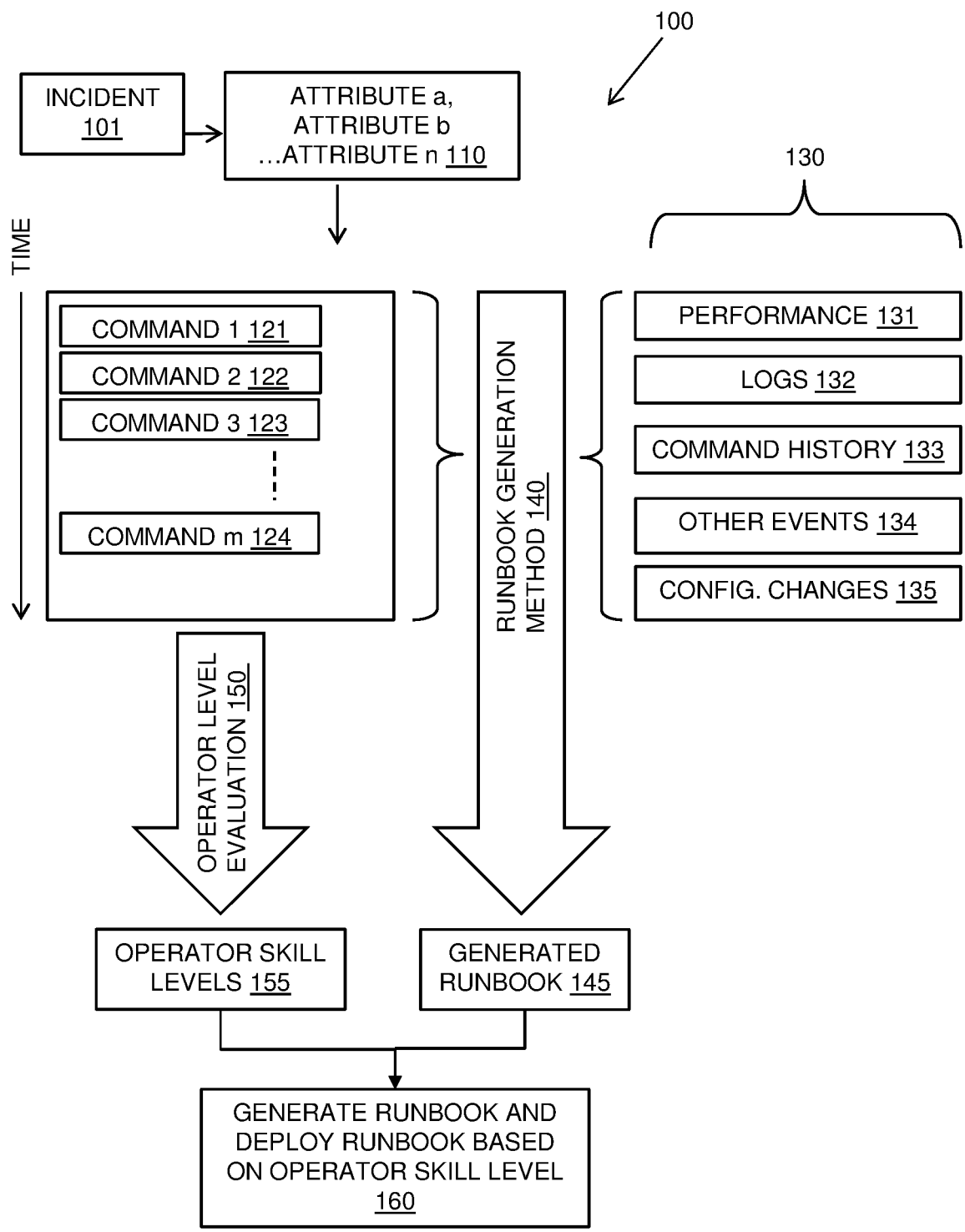
Figure 2A:
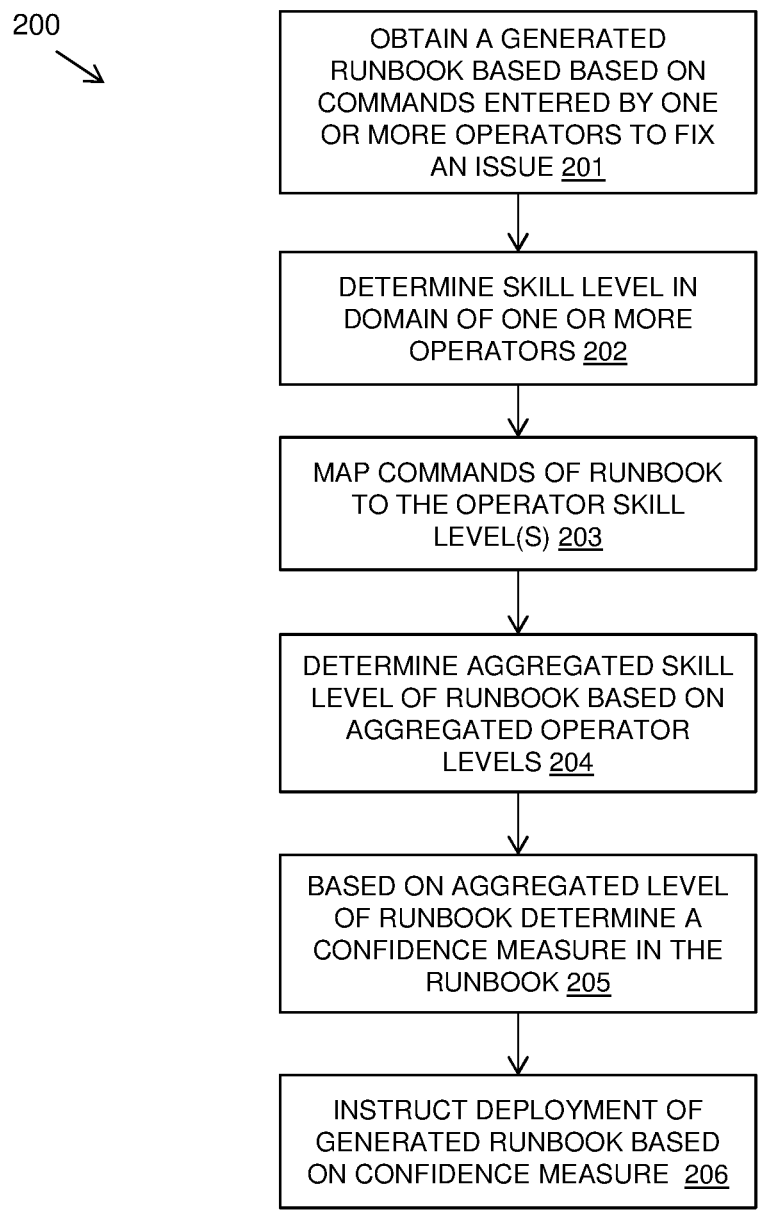
Figure 2B:
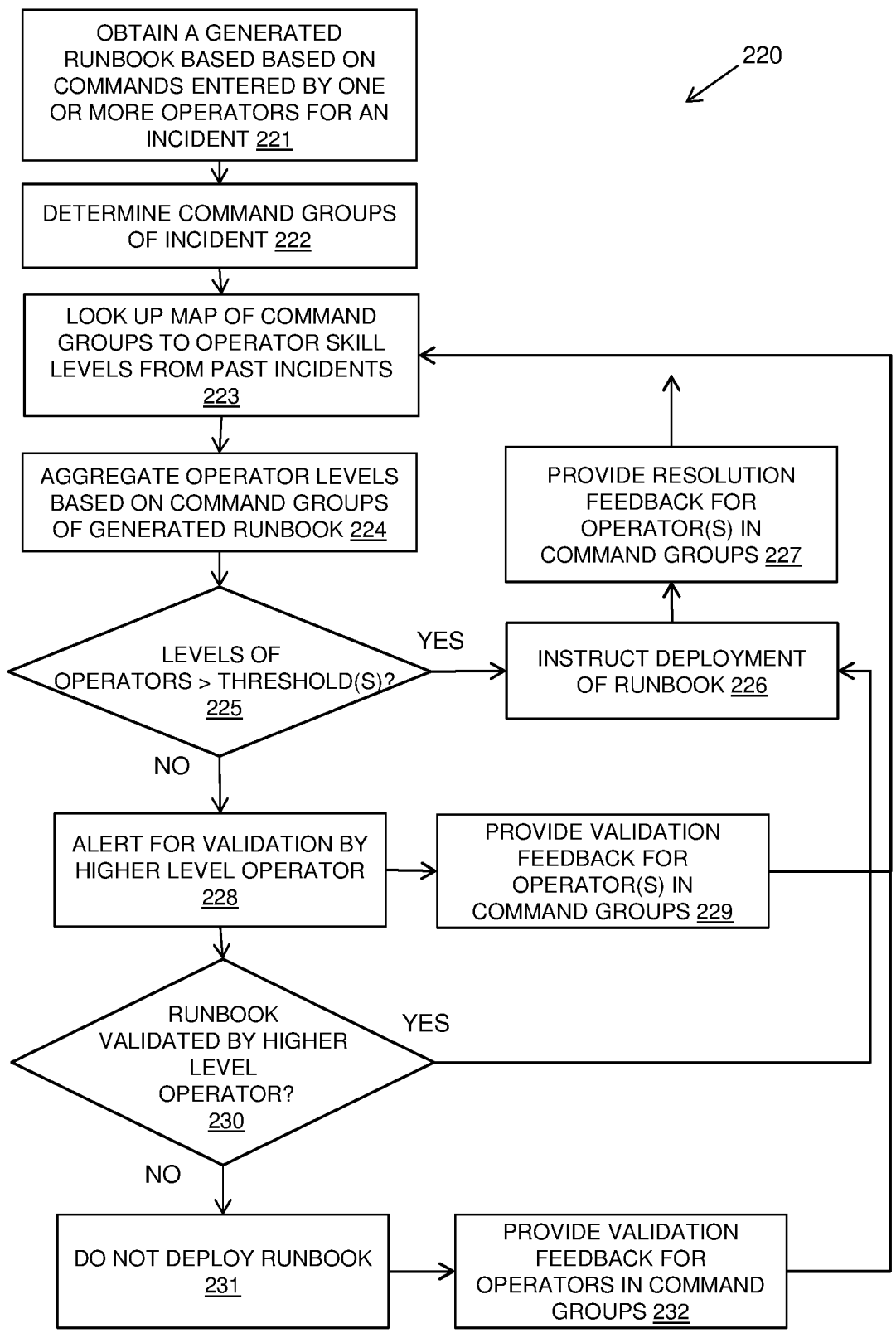
Figure 2C:
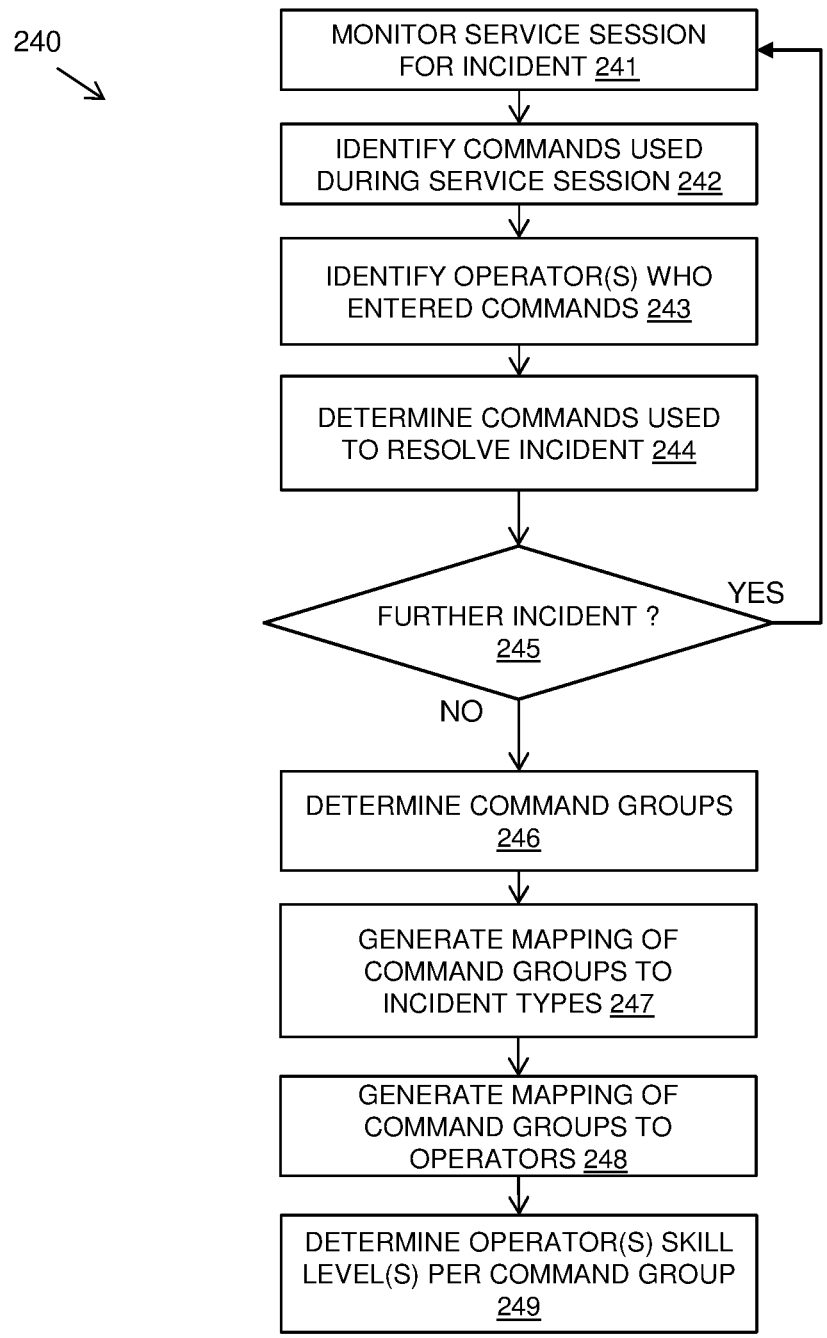
Figure 3:
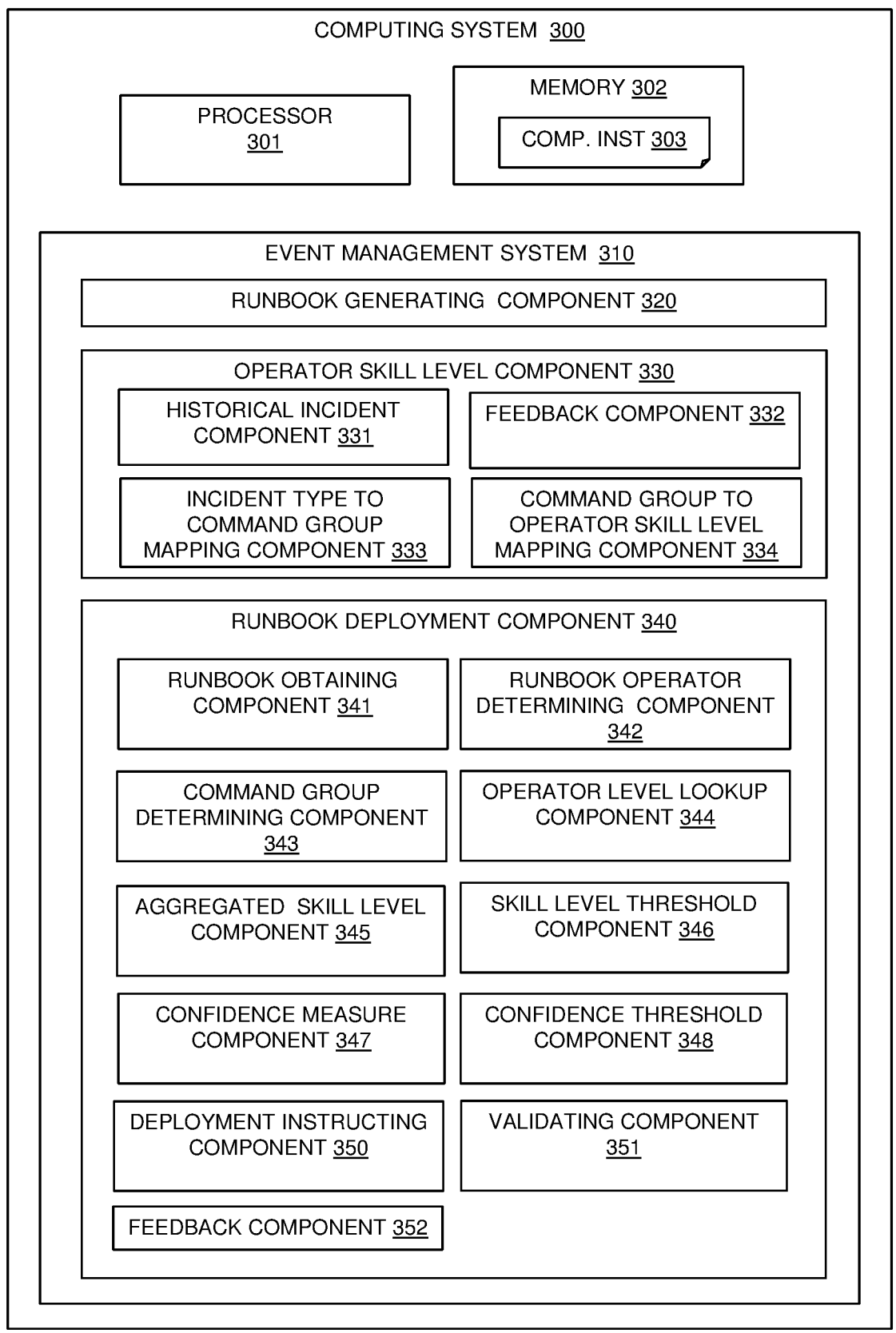
Figure 4:
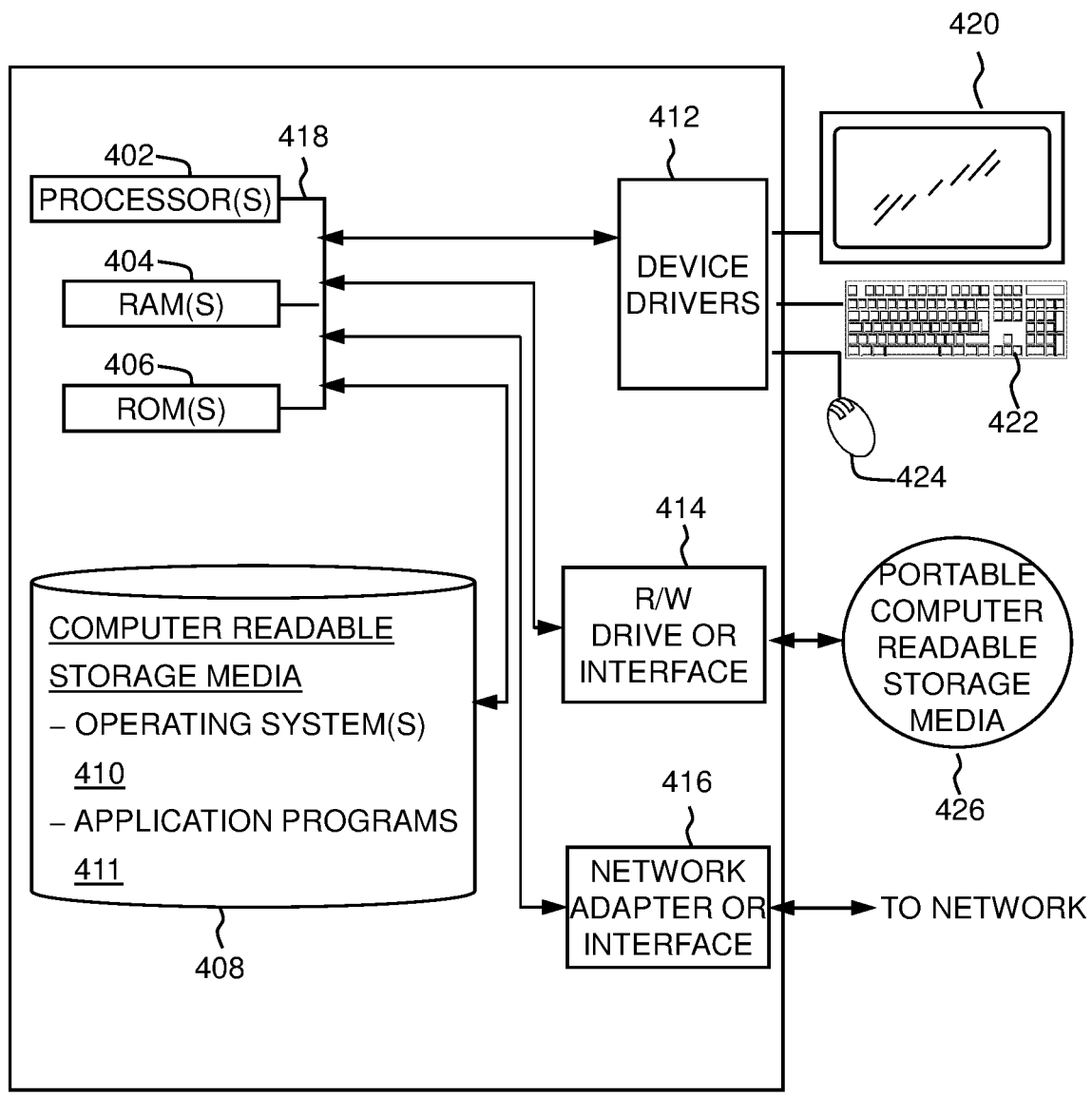
Figure 5:
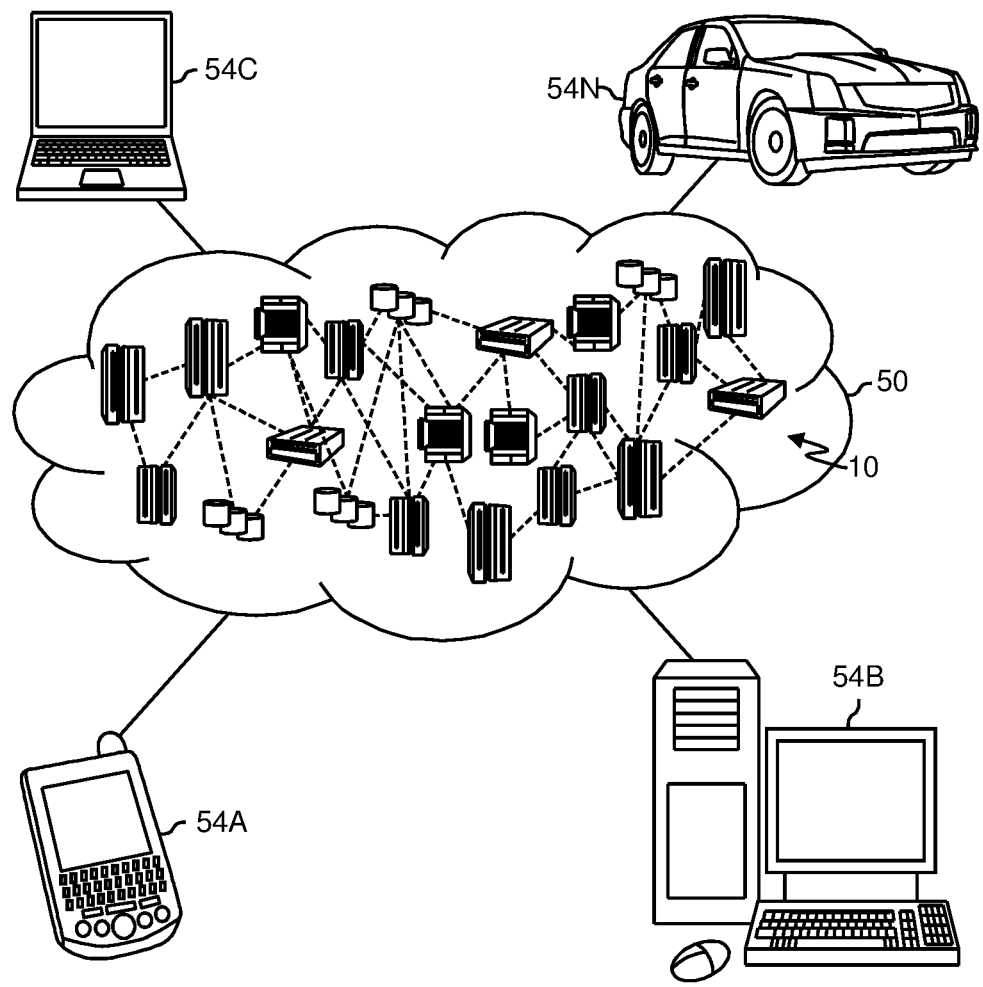
Figure 6:
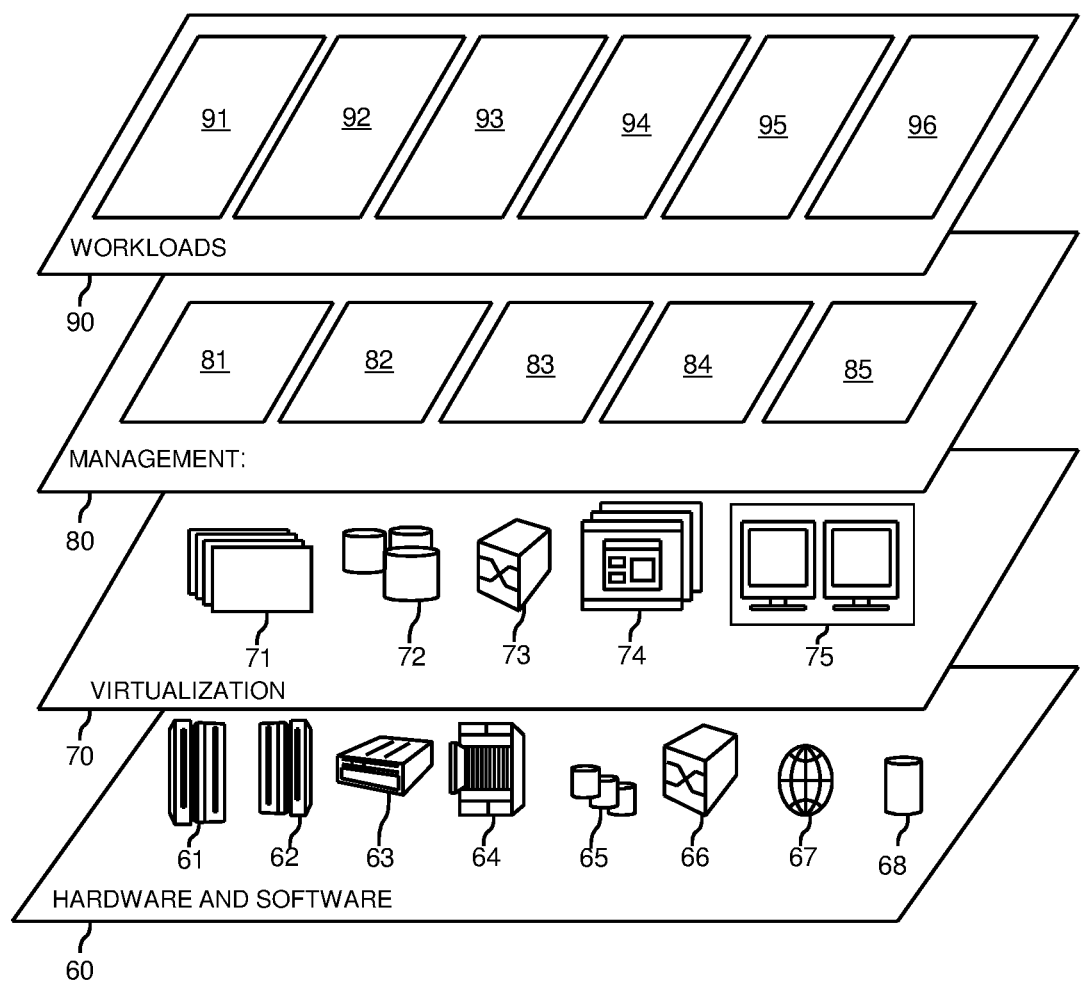

Some embodiments of the present invention will now be described, by way of example only, with reference to the following drawings in which:

FIG. 1 is a schematic diagram of an example embodiment of a method in accordance with the present invention;

FIG. 2A is a flow diagram of an example embodiment of an aspect of a method in accordance with the present invention;

FIG. 2B is a flow diagram of an example embodiment of an aspect of a method in accordance with the present invention;

FIG. 2C is a flow diagram of an example embodiment of an aspect of a method in accordance with the present invention;

FIG. 3 is block diagram of an example embodiment of a system in accordance with the present invention;

FIG. 4 is a block diagram of an embodiment of a computer system or cloud server in which the present invention may be implemented;

FIG. 5 is a schematic diagram of a cloud computing environment in which the present invention may be implemented; and FIG. 6 is a diagram of abstraction model layers of a cloud computing environment in which the present invention may be implemented.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A method and system are described for automated runbook deployment based on confidence evaluation of the skill level of one or more operators providing the commands on which the runbook is generated. The term "skill level" is used to refer to knowledge, ability, training, or other aspects of skills in a given domain. The domain at which a skill level is evaluated may be of different granularities, such as a general technology of an incident, or for more specific areas of technology such relating to aspects of an incident that are resolved by groups of commands.

Conventionally, weighting factors are determined for runbooks based on the effect the commands have on the system being resolved or repaired. However, depending on the expertise of the operator with respect to these systems, the commands may be more or less effective. There is a benefit in adding weight to commands issued by experts in a given system and giving less weight to those issued by less experienced operators. Operator expertise may be determined in a given domain through analysis of operator-executed commands in resolving prior issues.

While identifying when to create a runbook is a component of runbook automation, the system also should be able to estimate a confidence measure in order to determine whether or not a runbook should be deployed, reviewed, or removed. This provides for mitigating the likelihood of negative consequences stemming from usage of the runbook (automated or manual) on a live system.

In the described method, an operator's skill level is used as a metric to determine the candidacy of their actions taken to resolve an issue for use in runbook generation and runbook deployment automation. The use of domain knowledge as a constraint on runbook generation and deployment automation ensures invalid or detrimental runbooks are not created or invoked.

Referring to FIG. 1, a schematic diagram 100 illustrates an example embodiment of the described method. One or more operators are given the opportunity to connect to a host in a context of an incident 101 or issue, which may be in the context of a group of events. The incident 101 has multiple attributes 110 (Attribute a, Attribute b, . . . Attribute n) providing metadata. This metadata may include fields that relate to the incident, as well as where the incident or events within the incident occurred. For example, these may be an identifier of a failed disk, a hostname of a failed machine, a process identifier of a failed process, etc.

The operators may input a series of commands 121, 122, 123, 124 (Command 1, Command 2, Command 3, . . . . Command m) during a period of time. For example, a series of commands may result in a resolution of the incident with each command having arguments. Arguments are a form of variable that provides parameters used as an input to the execution of a program. For example, a series of commands may include:

```
$ command1 --arg1 a --arg2 b . . . --argN g
    command1 output
$ command2 --arg1 h --arg2 i . . . --argN n
    command2 output
$ command3 --arg1 a
    command3 output
```

The described runbook generation method 140 gathers the commands 121-124 in association with data from resources 130 to generate a runbook 145 for future handling of similar such incidents 101. The commands 121-124 may identify an operator that provided the command if more than one operator is involved in the commands used for the runbook generation.

The resources 130 may be, for example, in the form of performance 131, logs 132, command history 133, other events 134, configuration changes 135. The other events 134 may occur shortly after execution of a command and may be identified as related.

An operator level evaluation 150 is also carried out for the one or more operators inputting the series of commands 121, 122, 123, 124. This may involve reviewing historical resolutions of incidents of similar incident type. Operator skill levels 155 are determined for the operators and this is aggregated for the generated runbook 145. Deployment 160 of the generated runbook 145 is configured based a confidence measure determined from the aggregated skill level in the generated runbook determined by the operator skill levels 155.

Referring to FIG. 2A, a flow diagram 200 shows an example embodiment of the described method for runbook deployment based on confidence evaluation of one or more operator whose commands are used to generate the runbook.

The method may obtain 201 a generated runbook based on commands entered by one or more operators to resolve a problem incident of an incident type. The runbook is generated from the recorded commands of one or more operators against a given problem area. An identifier of each operator is be stored alongside the recorded commands and subsequently alongside the resulting runbook in order to allow for later retrieval.

The described method may determine 202 a skill level of the one or more operators on whose commands the generated runbook was based. The skill level may be based on historical resolutions by the one or more operator of incidents of the incident type in a knowledge domain. An operator's domain knowledge may be compared to defined thresholds and this may provide distinct skill levels. Alternatively, the skill level may be a continuous weighting providing a knowledge range metric.

An operator's domain skill level may be adapted based on feedback from incidents of similar type resolved by a runbook generated by the operator and/or by feedback from a validation of a runbook generated by the operator and validated by a higher-level operator.

The method may map 203 the commands of the runbook to the one or more operators' skill levels. It may be that a single operator has different skill levels for different forms of command such that commands are categorized and skill levels mapped with granularity of command groups involved in the generation of the runbook.

The method may determine 204 an aggregated skill level of the generated runbook based on the one or more operator skill levels. This may create an aggregated skill level for a generated runbook based on the combined ability of the set of operators whose actions caused those runbooks to be generated. This may also or alternatively be based on the combined skill level of a single operator across different types of commands where different skill levels for different types of commands have been mapped.

Where multiple operators are involved in a runbook generation, the operator skill levels may be weighted based on the input by each operator. A weighting may take various forms depending on various specifications, including: weighing by a proportion of commands provided by an operator; weighing commands from more experienced operators as assuming supervision of other operators; weighting commands from less experienced operators as potential weak spots; etc.

Based on the aggregated skill level of the one or more operators, a confidence measure in the generated runbook may be determined 205. The confidence measure may be a continuous weighting or a distinct level. The confidence measure may be determined by comparing the aggregated skill level for the generated runbook with specified thresholds of skill level; for example, for a skill threshold per command group, for selected command groups, or for the whole incident.

The method may instruct the deployment 206 of the generated runbook based on the confidence measure. The confidence measure may be used for automatic decision making with respect to the deployment, review, or removal of a runbook to mitigate the risk of negative impact on live systems.

Referring to FIG. 2B, a flow diagram 220 shows another example embodiment of the described method for automated runbook deployment based on confidence evaluation of one or more operators whose commands are used to generate the runbook.

The method may obtain 221 a generated runbook based on commands entered by one or more operators to resolve a problem incident of an incident type. Command groups may be determined 222 involved in resolving the incident and a map of command groups to operator skill levels based on historical incidents may be looked up 223 to determine skill levels of the operators involved in the generated runbook for command groups involved in the generated runbook.

Based on the skill levels of the operators involved in the generated runbook, an aggregated skill level is obtained 224. For a group of commands that have been used to generate the runbook for an incident type, it is possible to aggregate the skill levels of the operators who entered them for that incident type.

The skill levels of the operators involved in the generated runbook may be compared 225 to thresholds to determine a confidence measure of the generated runbook. It may be determined 225, if the operator levels are above specified thresholds. This may be a complex threshold evaluation using multiple skill levels of the one or more operators. As an example, a maximum across the operator skill levels for a given command group may be taken and compared to a specified threshold level. As another example, certain command groups may be better served to have a higher operator skill level than others. A complex threshold evaluation may, for example, take into account a lowest operator level if there is more than one operator and/or a percentage number of commands attributed to each operator.

If the aggregated skill level of the operators is above the specified thresholds, the generated runbook may be instructed to be deployed 226 either manually or automatically. Feedback on the resolution of the incident using the generated runbook may be provided 227 to update skill levels mappings 223 of the operators in the domain of the runbook, including for command groups involved in the runbook.

If the aggregated skill level is not above a deployment threshold level, an alert may be provided 228 for validation of the generated runbook by a higher-level operator such as a supervisor. Feedback on the validation of the generated runbook may be provided 229 to update skill levels mappings 223 of the operators in the domain of the runbook, including for command groups involved in the runbook.

It may be determined 230 if the generated runbook is validated by the higher-level operator or if it is removed. If it is validated, possibly after amendment or review, the generated runbook may be instructed to be deployed 226. Feedback on the resolution of the incident using the generated runbook may be provided 227 to update skill levels mappings 223 of the operators in the domain of the runbook.

If the generated runbook is not validated by the higher-level operator, then the runbook is instructed not to be deployed 231. Similarly, if the aggregated skill level of the operators is very low it may not be reviewed and it may be that the method automatically discards the generated runbook or provides a warning that the generated runbook is not for deployment.

Feedback on the validation resulting in non-deployment of the generated runbook may be provided 232 to update skill levels mappings 223 of the operators in the domain of the runbook.

Applying the skill levels of one or more operators involved in generating a runbook, it is possible to determine the capability of the generated runbook. A runbook generated by the actions of an operator or set of operators who are very proficient at using those actions is more likely to be successful at resolving a given problem than a runbook generated by a set of operators with less experience. This means that, given an automatically generated runbook, it is possible to infer how likely the runbook is to be accurate and successful.

This inferred information about how likely a given runbook is to be successful can be used to contribute to a confidence scale which, depending on its value, causes the generated runbook: to be automatically deployed (high value); to be sent for review (medium value); or to be ignored (low value).

Use is made of operators' skill level as an approach to simplify future resolutions of a type of incident through runbook generation such that operators with less domain knowledge can resolve future occurrences of the issue. Automating processing of future occurrences through runbook automation may remove the need for manual interaction entirely.

When a runbook is sent for review, due to a medium scale value, the result of the review can be captured and associated with the operator or set of operators who caused the runbook to be generated. This can then be used as a further metric for future runbooks generated from the actions of that operator or set of operators. Sets of operators whose actions typically cause the generation of runbooks with a high review success rate will be subsequently weighted higher, even if their calculated proficiency is lower.

In one embodiment, obtaining 201, 221 a generated runbook may obtain a runbook generated by a method and a system described in US Patent Application No. US2020/0004618 which is incorporated herein by reference. This discloses a method carried out by an event management application as follows.

The method may receive an operator connection to a host in a context of an event group for an issue or incident. The method may extract the details for connecting affected resources by extracting these details from the metadata of the problem events as given by the event attributes. A command line interface (CLI) session may start with any of the resources affected by the problem events, or to a custom resource, through the interface of the event management application. The method may receive commands executed on the host by the operator in order to resolve the issue. Any commands entered in CLI session(s) created through this interface, during the lifetime of this event group, are monitored and stored as related artifacts of the event group.

After the issue has been resolved and the group of events has cleared, the method may retain the information of which commands were executed against the affected resources in the context of the event group. The method may filter the command sets in order to remove any commands which do not result in any changes in system state. The method may match command arguments to event metadata for command set generalization.

The method may derive meaning from the commands as well as determining if a command influences a remote system that does not have comprehensive state change monitoring. This is achieved through several methods, including the textual analysis of the commands, through analysis of monitoring and logging of remote systems, and through the matching of resolution events associated with the incident to operator commands.

The method may analyze multiple historic occurrences of a group of event types and collates the sets of filtered and parameterized commands run in the context of each group. Each event has an event type attribute that describes the type of event. When looking at a group level, the matching may be performed against the set of event types within the group.

This acts to build a list of generalized command sets which have previously been used to fix issues of this type. A weighting may be provided based on the number of times the given set of commands has been applied to these issues and whether or not they resulted in event resolution. For command sets that have sufficient weighting, an automated runbook is generated by the system that can enact the commands on resources which exhibit the same issue.

Referring to FIG. 2C, a flow diagram 240 shows an example embodiment of a method of providing mappings of command groups to operator skill levels based on historical incident resolution.

A service session for an incident may be monitored 241. Monitoring a service session may include recording select parameters of each service session. For example, for each incident, record a type of the incident, an identity of the operator assigned to the incident, the commands entered by each operator assigned to the incident, a success or failure in using each command, a timestamp associated with any aspect of an incident (e.g., when the incident was assigned, a duration taken to resolve the incident, when each command was entered, etc.), fix layers for which the incident is linked, a manufacturer of hardware and/or software components, etc.

Commands used during the service session may be identified 242 including identifying 243 operators who entered commands. Each incident may have one or more operators assigned thereto. Each operator may use one or more commands in resolving the incident. Based on the information recorded during the monitoring of service sessions, commands may be identified that are used during the service sessions. Each operator may enter commands in an attempt to resolve the incident based on their past experiences, their knowledge of the system, instructions received for resolution, etc. Based on the information recorded during the monitoring of service sessions, the one or more operators who entered the commands may be identified.

It may be determined 244 which commands that were used contributed to resolving the incident. As every command may not lead towards the resolution of the incident, the commands used in resolving the incident may be filtered which provides at least a partial basis in generating skill level mappings.

The method of monitoring service sessions may be iterated 245 for multiple service sessions.

Once data has been obtained by iterating through multiple service sessions for historic incidents, command groups may be determined 246 where commands are grouped based on the effect of the commands on a particular aspect of the incident. Mappings of command groups to incident types may be generated 247. In generating the mapping, each incident may be taken as a whole or divided into constituent parts where the incident as a whole or each constituent part represents a type of incident. Mappings of command groups to operators may also be generated 248 by mapping the operators who entered each command of the command groups. Based on the commands that were used to successfully resolve the historic incidents, an operator skill level per command group can be determined 249.

This provides an automated way of determining the domain knowledge of operators based on their interactions with command line interfaces (e.g., via commands that are entered to resolve incidents) of problematic systems. By breaking down event resolution into groups of commands issued to fix a given incident or event, the method is configured to generate a many to many mappings between incident types and groups of commands. Additionally, through the monitoring of which operators issued the commands, the method may determine which operators are experienced with which command groups. Accordingly, the exemplary embodiments may generate a further mapping between operator skill sets and multiple types of incidents through the mapping between command groups and types of incidents.

Accordingly, the method may be configured to infer the abilities of the operators that entered commands and may provide an analysis that allows the method to determine operator skill levels based on the commands that the operator has used for previous resolutions of incidents.

Referring to FIG. 3, a block diagram shows an example embodiment of the described system in the form of a computing system 300 providing an event management system 310 including a runbook deployment component 340. The computing system 300 may include at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components.

The event management system 310 may include a runbook generating component 320 for generating runbooks based on command line interface commands entered by one or more operators, where the commands relate to resolving a problem incident of an incident type.

The event management system 310 may include an operator skill level component 330 for determining a skill level of the one or more operators based on historical resolutions of incidents of the incident type and may include an historical incident component 331 for providing information from historical incidents and a feedback component 332 for providing feedback from previously generated runbooks and their validation or execution. The operator skill level component 330 may include an incident type to command group mapping component 333 and a command group to operator skill level mapping component 334.

The event management system 310 may include a runbook deployment component 340 for determining if a generated runbook should be deployed or sent for further validation or review. The runbook deployment component 340 may include a runbook obtaining component 341 for obtaining a generated runbook from the runbook generating component 320. The runbook generating component 320 may be provided remotely at a different computing system to the runbook deployment component 340 or at the same computing system 300.

The runbook deployment component 340 may include a runbook operator determining component 342 for determining one or more operators involved in generating a runbook and a command group determining component 343 for determining command groups of the incident that contributed to the generated runbook. The runbook deployment component 340 may include an operator level lookup component 344 for looking up the mappings of the operator skill level component 330 for aggregating the operator skill levels for the command groups for the one or more operators for the generated runbook and an aggregated skill level component 345 for determining an aggregated skill level of the one or more operators for the generated runbook based on historical resolutions of incidents by the one or more operators. The aggregated skill level component 345 may combine skill levels of an operator per group of commands and/or multiple operators' levels to arrive at an aggregated skill level for a generated runbook. A skill level threshold component 346 may compare the aggregated skill level to defined thresholds to generate a confidence measure.

The runbook deployment component 340 may include a confidence measure component 347 for mapping a generated runbook to a confidence measure based on the aggregated skill level of the operators involved in the generated runbook and a confidence threshold component 348 for comparing a confidence measure of a generated runbook to a threshold confidence level specified for automatic deployment.

The runbook deployment component 340 may include a deployment instructing component 350 for instructing deployment of a generated runbook if the confidence threshold is met.

The runbook deployment component 340 may include a validation component 351 for providing an alert that a generated runbook is a member of a group that is betters served when review and validation is performed by a higher-level operator before being deployed.

The runbook deployment component 340 may include a feedback component 352 for providing feedback to the operator skill level component 330 based on an execution of the generated runbook and/or a validation of the generated runbook for the operators involved in the generated runbook.

FIG. 4 depicts a block diagram of components of the computing system 300 of FIG. 3, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing system 300 can include one or more processors 402, one or more computer-readable RAMs 404, one or more computer-readable ROMs 406, one or more computer readable storage media 408, device drivers 412, read/write drive or interface 414, and network adapter or interface 416, all interconnected over a communications fabric 418. Communications fabric 418 can be implemented with any architecture designed for passing data and/or control information between processors (such as microprocessors, communications and network processors, etc.), system memory, peripheral devices, and any other hardware components within the system.

One or more operating systems 410, and application programs 411, such as the event management system 310, the runbook generating component 320, the operator skill level component 330 and the runbook deployment component 340, are stored on one or more of the computer readable storage media 408 for execution by one or more of the processors 402 via one or more of the respective RAMs 404 (which typically include cache memory). In the illustrated embodiment, each of the computer readable storage media 408 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing system 300 can also include a R/W drive or interface 414 to read from and write to one or more portable computer readable storage media 426. Application programs 411 on computing system 300 can be stored on one or more of the portable computer readable storage media 426, read via the respective R/W drive or interface 414 and loaded into the respective computer readable storage media 408.

Computing system 300 can also include a network adapter or interface 416, such as a TCP/IP adapter card or wireless communication adapter. Application programs 411 on computing system 300 can be downloaded to the computing device from an external computer or external storage device via a network (for example, the Internet, a local area network or other wide area networks or wireless networks) and network adapter or interface 416. From the network adapter or interface 416, the programs may be loaded into the computer readable storage media 408. The network may comprise copper wires, optical fibers, wireless transmission, routers, firewalls, switches, gateway computers and edge servers.

Computing system 300 can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414, and network adapter or interface 416 can comprise hardware and software stored in computer readable storage media 408 and/or ROM 406.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and runbook deployment automation processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for runbook deployment based on confidence evaluation, comprising:
    identifying a current incident;
    obtaining a generated runbook for resolving a prior incident, the generated runbook including incident attributes, a series of commands entered by a plurality of operators over a period of time including a time of resolution of the prior incident, and mapping of the plurality of operators who entered the series of commands to each command, the commands executed against affected resources and resulting in system state changes during resolution of the incident;
    determining, for each operator, an operator skill level for entering commands mapped to each operator during the period of time based on historical resolutions of other incidents by each operator;
    responsive to determining operator skill levels for each operator, aggregating individual operator skill levels of the plurality of operators to establish an aggregated skill level of the generated runbook; and
    responsive to the aggregated skill level being above a deployment threshold level, automatically deploying the runbook commands of the generated runbook to resolve the current incident.

2. The method as claimed in claim 1, wherein determining an aggregated skill level is determined by aggregating skill levels of each of the one or more operators for command groups contributing to the generated runbook.

3. The method as claimed in claim 1, wherein determining an aggregated skill level of the one or more operators for the generated runbook based on historical resolutions of incidents by the one or more operators includes:
    providing a mapping of operator skill levels to command groups based on historical resolutions of incidents by the one or more operators;
    determining command groups of the incident that contributed to the generated runbook; and
    looking up the mapping and aggregating the operator skill levels for the command groups for the one or more operators for the generated runbook.

4. The method as claimed in claim 1, wherein determining a confidence measure of the generated runbook based on the aggregated skill level for the generated runbook includes comparing the aggregated skill level with defined thresholds.

5. The method as claimed in claim 1, wherein the defined thresholds include taking a maximum operator skill level for each command group involved in the generated runbook and comparing to operator skill thresholds.

6. The method as claimed in claim 1, wherein the defined thresholds include providing weightings of operator skill levels based on an importance or a size of a command group involved in the generated runbook.

7. The method as claimed in claim 1, wherein automatically deploying the generated runbook includes:
    automatically deploying the generated runbook without validation.

8. The method as claimed in claim 1, wherein automatically deploying the generated runbook includes:
    determining that the confidence measure is below a threshold confidence measure; and
    providing an alert for validation of the generated runbook before executing the generated runbook.

9. The method as claimed in claim 8, including providing feedback to a skill level of an operator based on results of a validation of a generated runbook.

10. The method as claimed in claim 1, wherein obtaining the generated runbook includes:
    responsive to identifying the incident type, automatically converting, by a runbook generating component, the operator commands to a set of runbook commands for resolving the incident type, the converting including filtering, analysis, and generalization of the operator commands entered for historical resolutions of the incident type.

11. A system for runbook deployment based on confidence evaluation, comprising:

a processor and a memory configured to provide computer program instructions to the processor;
wherein:
the processor set executes the computer program instructions that cause the processor set to perform a method comprising:
identifying a current incident;
obtaining a generated runbook for resolving a prior incident, the generated runbook including incident attributes, a series of commands entered by a plurality of operators over a period of time including a time of resolution of the prior incident, and mapping of the plurality of operators who entered the series of commands to each command, the commands executed against affected resources and resulting in system state changes during resolution of the incident;
determining, for each operator, an operator skill level for entering commands mapped to each operator during the period of time based on historical resolutions of other incidents by each operator;
responsive to determining operator skill levels for each operator, aggregating individual operator skill levels of the plurality of operators to establish an aggregated skill level of the generated runbook; and
responsive to the aggregated skill level being above a deployment threshold level, automatically deploying the runbook commands of the generated runbook to resolve the current incident.

12. The system as claimed in claim 11, further causing the processor set to perform a method comprising:
mapping of operator skill levels to command groups based on historical resolutions of incidents by the one or more operators;
determining command groups of the incident that contributed to the generated runbook; and
looking up the mapping for aggregating the operator skill levels for the command groups for the one or more operators for the generated runbook.

13. The system as claimed in claim 11, further causing the processor set to perform a method comprising:
determining a confidence measure of the generated runbook based on the aggregated skill level for the generated runbook by comparing the aggregated skill level with defined thresholds.

14. The system as claimed in claim 11, further causing the processor set to perform a method comprising:
providing an alert for validation of the generated runbook before executing the generated runbook if the confidence measure is below a threshold confidence measure.

15. The system as claimed in claim 11, further causing the processor set to perform a method comprising:
providing feedback to a skill level of an operator based on results of deployment of the generated runbook and/or a validation of a generated runbook.

16. The system as claimed in claim 15, further causing the processor set to perform a method comprising:
providing feedback for an operator in relation to a command group involved in the generated runbook.

17. The system as claimed in claim 11, further causing the processor set to perform a method comprising:
responsive to identifying the incident type, automatically converting the operator commands to a set of runbook commands for resolving the incident type, the converting including filtering, analysis, and generalization of the operator commands entered for historical resolutions of the incident type and includes recording an identifier of the operator providing operator commands.

18. A computer program product for runbook deployment based on confidence evaluation, the computer program product comprising a computer readable storage medium having program instructions embodied therewith, the program instructions executable by a processor to cause the processor to:
identify a current incident;
obtain a generated runbook for resolving a prior incident, the generated runbook including incident attributes, a series of commands entered by a plurality of operators over a period of time including a time of resolution of the prior incident, and mapping of the plurality of operators who entered the series of commands to each command, the commands executed against affected resources and resulting in system state changes during resolution of the incident;
determine, for each operator, an operator skill level for entering commands mapped to each operator during the period of time based on historical resolutions of other incidents by each operator;
responsive to determining operator skill levels for each operator, aggregate individual operator skill levels of the plurality of operators to establish an aggregated skill level of the generated runbook; and
responsive to the aggregated skill level being above a deployment threshold level, automatically deploy the runbook commands of the generated runbook to resolve the current incident.

19. The computer program product of claim 18, wherein obtaining the generated runbook includes:
responsive to identifying the incident type, automatically converting, by a runbook generating component, the operator commands to a set of runbook commands for resolving the incident type, the converting including filtering, analysis, and generalization of the operator commands entered for historical resolutions of the incident type.

* * * * *